Aug. 1, 1961 W. E. SNYDER 2,994,198
CLOSED CIRCUIT GAS TURBINE CONTROLS
Filed Sept. 3, 1957
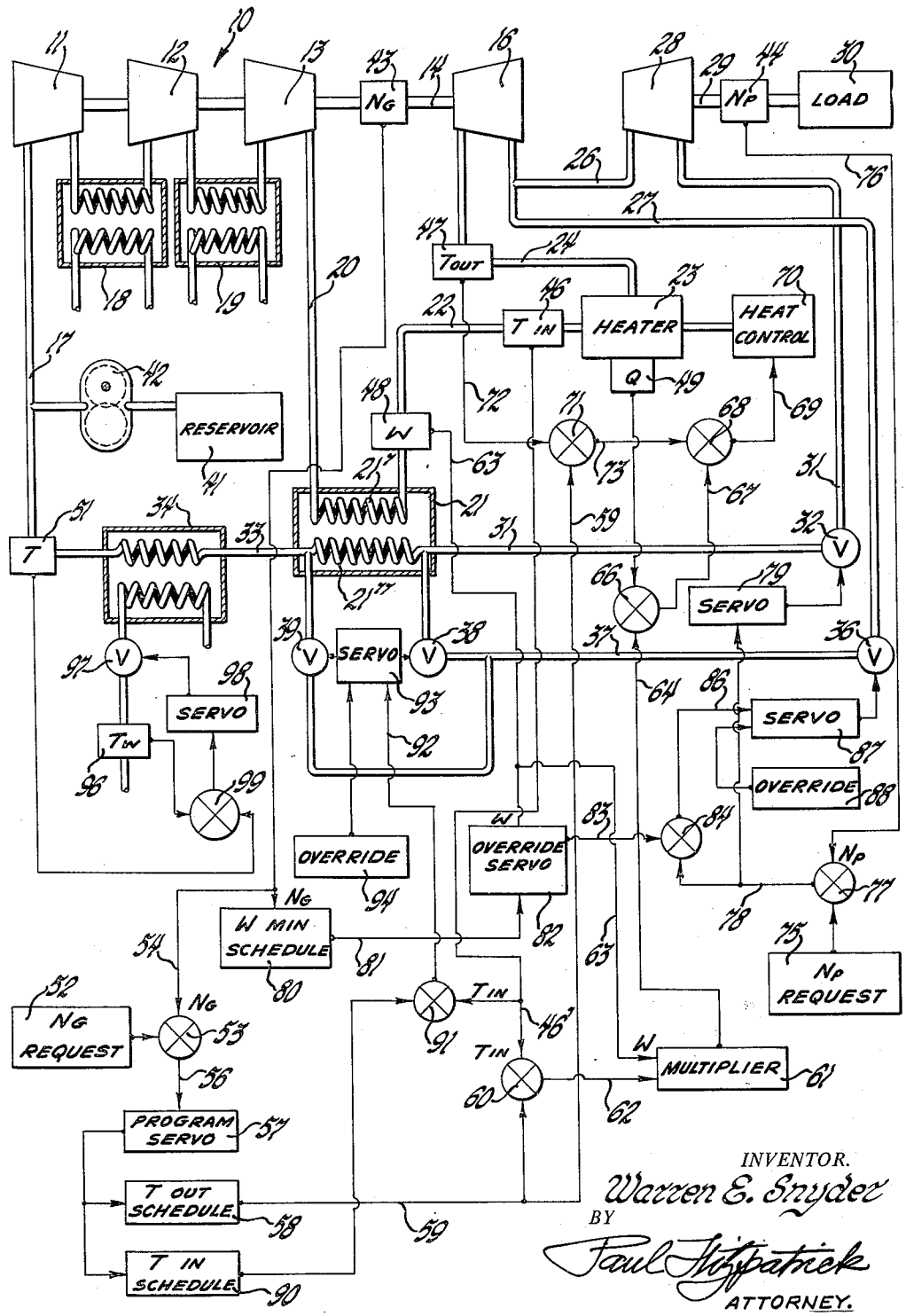
INVENTOR.
*Warren E. Snyder*
BY
*Paul Fitzpatrick*
ATTORNEY.

United States Patent Office 2,994,198
Patented Aug. 1, 1961

2,994,198
CLOSED CIRCUIT GAS TURBINE CONTROLS
Warren E. Snyder, Rochester, N.Y., assignor to General Motors Corporation, Detroit, Mich., a corporation of Delaware
Filed Sept. 3, 1957, Ser. No. 681,779
4 Claims. (Cl. 60—59)

This invention relates to control systems for gas turbine power plants. It is particularly suited to the control of a closed circuit type of power plant and particularly one in which the device for heating the motive fluid does not readily admit of rapid change in the rate at which heat is supplied to the motive fluid. One example of such a heater would be a heater embodying an atomic reactor.

As will be apparent, however, from the succeeding detailed description of the preferred embodiment of the invention, the invention may be applied to gas turbine power plants of various types and with various types of heaters.

The drawing is a schematic diagram of a closed circuit gas turbine power plant embodying a control system according to the invention.

The closed circuit power plant comprises a compressor group 10 made up of a low pressure compressor 11, an intermediate pressure compressor 12, and a high pressure compressor 13. These are connected for joint rotation by shaft 14 to a compressor-driving turbine, or gasifier turbine, 16. The motive fluid, which is a gas and may be helium, enters compressor 11 from an aftercooler through a line 17, passes through intercoolers 18 and 19 between the compressors, and is discharged from the high pressure compressor through line 20, high pressure pass 21' of regenerator 21, and line 22 to the heater 23. The heater 23 may be any suitable device heated by atomic reaction or by combustion, for example. From the heater, the gas passes through line 24 to the gasifier turbine 16 and from the turbine exhaust through either of lines 26 and 27. Line 26 connects to the inlet of a power turbine 28 which drives through shaft 29 the external load 30 of the system. The load 30 may be any driven device such as, for example, the propeller of a ship.

The exhaust of power turbine 28 is connected by a line 31 in which there is a throttling valve 32 to the other pass 21" of regenerator 21. The fluid is discharged from the regenerator through line 33 and an aftercooler or aftercoolers 34 into line 17. This completes the main or normal operating circuit for the gas.

Line 27 is a bypass line for the power turbine. Line 27 connects through a bypass throttling valve 36 to a line 37 which is connected through valves 38 and 39 to the regenerator low pressure pass fluid entrance and discharge lines 31 and 33. In normal operation of the system, gas compressed in the compressor group 10 is heated in the high pressure pass 21' of the regenerator, further heated in the heater 23, and partially expanded in turbine 16 which drives the compressors. The gas is still further expanded in turbine 28 and flows through the regenerator 21, giving up heat to the compressed gas and through aftercooler 34 where heat is removed to bring the gas back to a suitable compressor inlet temperature.

The power output of the power turbine 28 may be reduced by closing throttling valve 32. When this is done, bypass valve 36 is opened to prevent throttling of the gasifier turbine. The valves 38 and 39 are provided to cause some of the motive fluid bypassing the power turbine to bypass also the regenerator 21.

The quantity of gas in the power circuit may be varied by suitable mechanism immaterial to the invention. As indicated on the schematic, gas may be stored in a reservoir 41 from which it may be pumped into the power circuit or to which it may be delivered from the power circuit by a pump and control means indicated as a pump 42. This invention is not concerned with the means by which the quantity of gas in the power circuit is varied or with any controls for such purpose. It is concerned primarily with controlling normal operation of a system with a constant weight of gas in the circuit.

In order to effect the control, a number of meters or sensing devices responsive to certain conditions of operation of the plant are required. These include a gasifier turbine speed meter 43 driven by turbine 16, a power turbine speed meter 44 driven by turbine 28, and temperature meters 46 and 47 connected in the heater inlet and outlet lines respectively to measure temperature of gas entering and leaving the heater. A mass flowmeter 48 is provided at some point in the circuit, preferably in the line between the regenerator and the heater inlet. A heat release meter 49 measuring the heat output of the heater or some condition indicative of the heat release of the heater, such as a neutron flux meter, for example, is provided. Also thermometer 51 may be provided in the outlet of the aftercooler 34.

It will be understood that these various meters or responsive devices should be of such character as to provide an output signal indicative of the value of the measured quantity whether speed, temperature, mass flow, or heat release. Such a signal may be mechanical, electrical, pneumatic, or hydraulic. In other words, the signal may be the rotation of a shaft, the value of a current or potential, or the value of a fluid pressure, for example. The signals which are the outputs of the metering devices are suitably transmitted and combined and thus are employed to supervise or control the operation of the power plant.

As preferably constituted, the primary control during operation of the power plant is a signal of desired gasifier turbine speed which may be termned "$N_G$ request," the $N_G$ request being provided by a suitable manually operable control 52. The speed request signal is compared by a differential 53 with the gasifier turbine speed signal from line 54. The differential is a subtracting device suited to the character of the signals. The difference between the signals, which may be termed "speed error" is supplied through line 56 to a program servo 57. The program servo is a device which operates to increase or decrease the power level of the power plant by varying the output of the heater. If the gasifier turbine speed is less than that requested, it will be because of insufficient heat release. In this case, the program servo operates to increase the heat release. Similarly, if gasifier turbine speed is higher than that set by the request device 52, the heat release will be decreased. The basic control of heat release is based upon scheduling a desired temperature out; that is, heater outlet temperature. The schedule is generated by an outlet temperature scheduling device 58 driven by the program servo. This scheduling device generates a temperature signal which increases as the program servo moves in the direction to call for increased heat release. The scheduled temperature out is fed by appropriate means 59 to a differential 60 which also receives an input of measured temperature of gas entering the heater from thermometer 46 through line 46'.

The output of the differential is the desired temperature rise, the difference between desired or scheduled outlet temperature and measured inlet temperature, which is one factor of the expression which determines the heat release required in the heater. To produce the desired temperature out, the heat release Q of the heater should be a constant times the desired temperature rise times the mass flow. This is determined by a suitable multiplier 61 which receives through 62 the desired temperature rise and through 63 the actual mass flow from flowmeter 48. The product of these quantities times the necessary constant is fed through line 64 to a differential 66 in which it is subtracted from the actual or measured heat release determined by meter 49. The difference between these quantities is fed through line 67, differential 68, and line 69 to a heat control 70 which is capable of changing the heat release rate of the heater by means suitable to the nature of the heater. The difference between the desired and actual heat release rates fed into the heat control causes the heat release rate to be increased or decreased to reduce the difference.

The function of differential 68 is to provide a trimming control which helps to stabilize the operation of the heater and its controls. Differential 68 feeds a modifying or trimming signal which varies the setting of the heat control 70 and which is derived from the difference between actual heater outlet temperature and scheduled heater outlet temperature. The scheduled outlet temperature is supplied through line 59 to differential 71 and the actual outlet temperature from meter 47 through line 72. The error signal obtained in the differential by subtraction line 73 into trimming differential 68. Thus, if the actual temperature out does not agree with that schedule, the datum of the heat control is adjusted. Changes in the quantities which determine the heat required, however, remain in control to schedule changes in heat release through the action of differential 60, multiplier 61, and differential 66.

Proceeding to a description of the control of the power turbine, it will be apparent that the output of the power turbine is limited by the energy available in the exhaust of the gasifier turbine and thus by the energy level of the system determined by the heat release rate of the heater. The power turbine may be controlled to deliver the maximum power available in view of the energy level of the system or to deliver any smaller amount of power. In the system illustrated, the power level of the power turbine is scheduled in terms of speed. In other words, a manually controllable power turbine speed request device 75 is set to call for a definite power turbine speed which will be maintained by the power turbine if the power level of the system is high enough in relation to the load on the turbine. The load may be of such a character that the power required is somewhat closely determined by speed as, for example, a ship propeller.

It would, of course, be possible to schedule power turbine output in terms of torque or some other quantity, if desired. The speed control is very suitable for most purposes. With the speed control, the power turbine speed measuring device 44 feeds a signal through line 76 to differential 77 which also receives the power turbine speed request. The output through line 78 is power turbine speed error. If the speed error is positive or, in other words, the power turbine speed is greater than called for, this signal energizes a servo 79 which moves throttle valve 32 in a closing direction to reduce the motive gas flow through the power turbine. In case of underspeed, valve 32 is moved to open if not already fully open. Valve 32 is open in what may be termed normal operation of the system. It is closed only if it becomes necessary to throttle flow through the power turbine because otherwise it would overspeed.

As the throttling valve 32 moves toward closed position, the bypass valve 36 moves from a closed condition toward an open condition. This is necessary to maintain flow through the gasifier turbine and heater. The basic control of valve 36 is similar to that of valve 32 except that it moves in the opposite sense. However, an override is provided to cause the bypass valve 36 to open beyond the opening called for by the power turbine control whenever the gasifier turbine flow drops to a point where surge of the compressor group impends. For any given speed of the compressors there is a minimum rate of flow of gas in the system which should be maintained to avoid danger of surge. This may be determined by computation or empirically. Once this relationship is determined, it is embodied in a minimum flow scheduling device 80 which receives an input of gasifier turbine speed and provides an output through line 81 of the minimum mass flow which is safe for operation. This value is supplied to an override servo 82 which also receives from flowmeter 48 an input of the actual mass flow. The servo device 82 is a unidirectional or overriding type of device in that it responds only to a deficiency of mass flow below the output of scheduling device 80. As soon as the schedule increases or the mass flow decreases so that the deficiency below the safe value begins, the servo device 82 drives an input 83 to differential 84. This differential also receives the power turbine speed error signal from line 78. Under normal conditions the output of the differential through line 86 is this speed error signal, and it serves to control servo 87 to move valve 36 from closed condition toward open as valve 32 moves from open toward closed. The normal scheduling or characteristic of these servos and valves 32 and 36 is such that the total resistance to flow in the exhaust of the gasifier turbine 16 remains constant. If, however, the surge region is approached, as indicated by the override servo 82, this servo acts through differential 84 to modify the input to servo 87 and provide additional opening of valve 36.

The override 88 is simply a manual control of servo 87 which makes it possible to open bypass valve 36 fully, which is desirable in starting the gasifier turbine.

Whenever there is a rapid decrease in the power requirement and substantial quantities of gas are bypassed through line 27, this gas is hotter than the gas which has passed through the power turbine. If this hot gas were all fed through pass 21″ of the regenerator, an undesirable transient in heater inlet temperature would be caused. It is desirable to hold heater inlet temperature against sudden excursions, although it may vary slowly with changes in system power level.

Such transients are prevented by an arrangement to bypass some of the power turbine bypass gas around the regenerator. This is accomplished by valves 38 and 39 connecting bypass line 27, 37 alternatively to the inlet and outlet of the regenerator. In normal operation, valve 38 is open and valve 39 is closed. Valve 38 is moved toward closed and valve 39 toward open position in response to an increase in heater inlet temperature measured by metering device 46. The inlet temperature is supplied to a differential 91 which also receives a signal from an inlet temperature scheduling device 90 driven by the program servo. The device 90 provides an output of the normal inlet temperature corresponding to the scheduled outlet temperature at the particular energy level to which the program servo has moved. The output of differential 91, which is the inlet temperature error in line 92, energizes a servo 93 connected to both valves 38 and 39. If the measured inlet temperature goes above the schedule the servo is actuated to throttle valve 38 and open valve 39, thus reducing flow through the regenerator, the heat transferred to the compressed gas, and the inlet temperature. If the inlet temperature is below the schedule, valve 39 will be closed.

A manual override 94 is provided so that valve 38 may be closed and valve 39 opened wide in starting the gasifier turbine.

Bypassing the low pressure side of the regenerator tends to increase the temperature in line 33 through which the gas enters the aftercooler. To prevent this temperature rise from continuing into the compressors, the flow of cooling water to the aftercooler 34 may be modulated in accordance with the temperature of the return gas as measured by the thermometer device 51 downstream of the aftercooler. An elementary control may comprise a valve 97 controlling the flow of cooling water through aftercooler and a servo 98 to operate the valve. The temperature of the cooling water measured by thermometer 96 and of the gas measured by thermometer 51 are fed to a differential 99 which controls the servo so as to adjust water flow to maintain a predetermined practicable temperature difference between the water flowing to the cooler and the gas flowing from it.

It is believed that the operation of the power plant and controls will be clear to those skilled in the art from the foregoing, but it may be in order to review them briefly. Assuming that the system is out of operation, the weight of gas in the system ordinarily will be low, the gas having been pumped into the reservoir 41. To start the power plant, the gasifier turbine and compressors are turned over by a starting motor (not shown). The power turbine bypass valve 36 and regenerator bypass valve 39 are opened and valve 38 is closed by operation of the override controls 88 and 94. The program servo will start from its shutdown position in which outlet temperature is scheduled at the minimum value. As the cranking of the engine is started, the manual control 52 will be actuated to call for some suitable idling value of turbine speed which may be, for example, 70% of normal operating speed. The program servo will then move to increase the schedule outlet temperature at a rate commensurate with the characteristics of the heater. As the output of the heater increases, some energy will be contributed by the turbine, the amount increasing as the heat release increases. At some value of heat release the turbine will become self-sustaining and the starter may be de-energized. Either during this portion of the starting cycle or subsequently thereto, the pump 42 may be operated to bring the quantity of gas in the system up to that usual in normal operation. During the starting cycle, the servo 93 may be actuated to open valve 38 and close valve 39 to put the regenerator 21 into normal operation. When the gasifier turbine reaches idle speed, the override signal on the power turbine bypass valve 36 is removed so that this valve goes to its normal position, maintaining substantially the normal operating pressure drop in the gasifier turbine exhaust.

If the gasifier turbine speed request is left at the idle speed level, the heater output will level off when the turbine reaches this speed level. If desired, the speed request could be moved up to full speed, causing gradual acceleration of the gasifier turbine to full speed as the heat release increases.

At any heat release rate between idle and full power, whatever gas HP is available in the exhaust of the gasifier turbine may be employed to drive the load by actuating control 75 to set a speed for the power turbine. This will cause opening of throttle 32 and closing of bypass 36 to direct sufficient motive fluid through turbine 28 to generate enough power to cause the turbine to satisfy the speed request. If insufficient gas HP is available, valve 32 will open wide and valve 36 will close completely, and the power turbine will deliver whatever power is available. Obviously, if the desired power output is greater than is available, the speed of the gasifier turbine and the heat release of the heater should be increased to provide the desired gas HP. Conversely, in steady state operation, if the system generates more gas than is required by the power turbine, the energy release rate should be decreased, if not already at idling level.

Under certain conditions, however, such as temporary reduction of power, as in maneuvering a ship, it may be desirable to maintain the rate of heat release constant and stop the power turbine or reduce its output by operating the throttling and bypass valves 32 and 36. In this case, the resulting increase in temperature at inlet temperature meter 46 will act on servo 93 to move valve 38 in a closing direction and valve 39 in an opening direction to hold the heater inlet temperature on schedule. The resulting increase in temperature of gas leaving the regenerator is compensated for by the aftercooler water flow control.

It will be apparent to those skilled in the art that the control system described is particularly adapted to sensitive and accurate control of closed circuit and other gas turbine systems and particularly those in which the heat release rate is not readily varied at an extremely rapid rate and in which it is advantage to avoid temperature transients in the system which might be harmful to elements of the system.

The physical embodiments of the various measuring, transmitting, computing, scheduling, and servo devices may be of any nature readily available. The control system may, as previously state, be of a mechanical, electrical, or fluid pressure type, or, as frequently is the case in control systems, it may involve a mixture of these or other types of controls. The invention is not concerned with details of these mechanisms but with the organization of control instrumentalities of known type having suitable characteristics into a system capable of securing the desired results.

The detailed description of the preferred embodiment of the invention for the purpose of explaining the principles thereof is not to be considered as limiting or restricting the invention, as many modifications may be made by the exercise of skill in the art within the scope of the invention.

I claim:

1. The combination with a gas turbine system comprising a compressor, a heater, and a turbine connected in a working medium circuit of a control system comprising settable means establishing a required value of turbine speed, means responsive to actual turbine speed, differential means operated by the settable means and the responsive means providing an output of turbine speed error, programming means including a servo operable gradually and progressively in response to the output of the differential means in a direction determined by the sense of the speed error to provide a gradually variable output, an energy release control connected to the heater operable to vary the energy release of the heater, and means connecting the energy release control to the output of the programming means for operation thereby.

2. The combination with a gas turbine system comprising a compressor, a heater, a compressor-driving turbine, and a power turbine connected in a working medium circuit of a control system comprising a mass flowmeter in the circuit, a heater inlet thermometer, a heater outlet thermometer, a heater energy release meter, a heater energy release control, programming means establishing a value of a condition indicative of energy required from the heater, the programming means including servo means operative to drive the programming means so as to vary gradually the established value of the said condition, means responsive to the established value of the said condition and the output of said thermometers and flowmeter for determining energy required from the heater, and means comparing the output of the said responsive means with the output of the energy release meter and connected to control the heater energy release control.

3. The combination with a gas turbine system comprising a compressor, a heater, and a compressor-driving turbine connected in a working medium circuit of a control system comprising a mass flowmeter in the circuit, a heater inlet thermometer, a heater energy release meter, a heater energy release control, programming means establishing a value of heater outlet temperature indicative of energy required from the heater, the programming means including servo means operative to drive the programming means so as to vary gradually the established value of heater outlet temperature, means responsive to the mass flow, measured heater inlet temperature, and the established value of heater outlet temperature for determining energy required from the heater, and means comparing the output of the said responsive means with the output of the energy release meter and connected to control the heater energy release control.

4. The combination with a gas turbine system comprising a compressor, a heater, a compressor-driving turbine, and a power turbine connected in a working medium circuit of a control system comprising a compressor-driving turbine speed meter, a heater energy release meter, a heater energy release control, a settable compressor-driving turbine speed control, programming means actuated by the settable control and the speed meter establishing a value of a condition indicative of energy required from the heater, the programming means including a servo responsive to the settable control and the speed meter operative to drive the programming means so as to vary gradually the established value of said condition, means responsive to the value of the said condition for determining energy required from the heater, and means comparing the output of the said responsive means with the output of the energy release meter and connected to control the heater energy release control.

References Cited in the file of this patent
UNITED STATES PATENTS

| | | |
|---|---|---|
| 2,454,358 | Traupel | Nov. 23, 1948 |
| 2,572,253 | Fellows et al. | Oct. 23, 1951 |
| 2,667,344 | Robbins | Jan. 26, 1954 |
| 2,771,286 | Clark | Nov. 20, 1956 |